United States Patent
Kurtenbach

[19]

[11] Patent Number: 5,867,163
[45] Date of Patent: Feb. 2, 1999

[54] GRAPHICAL USER INTERFACE FOR DEFINING AND INVOKING USER-CUSTOMIZED TOOL SHELF EXECUTION SEQUENCE

[75] Inventor: Gordon P. Kurtenbach, Toronto, Canada

[73] Assignee: Silicon Graphics, Inc., Mountain View, Calif.

[21] Appl. No.: 944,493

[22] Filed: Oct. 6, 1997

Related U.S. Application Data

[63] Continuation of Ser. No. 566,078, Dec. 1, 1995, abandoned.

[51] Int. Cl.[6] ....................................................... G06F 3/00
[52] U.S. Cl. ........................................... 345/354; 305/672
[58] Field of Search ................................... 345/339, 348, 345/349, 354; 395/672, 676; 364/944.6

[56] References Cited

U.S. PATENT DOCUMENTS

| | | | |
|---|---|---|---|
| 5,287,502 | 2/1994 | Kaneko | 707/4 |
| 5,313,574 | 5/1994 | Beethe | 345/356 |
| 5,497,455 | 3/1996 | Suga et al. | 345/348 |
| 5,551,041 | 8/1996 | Beethe | 395/733 |
| 5,623,592 | 4/1997 | Carlson et al. | 345/348 |
| 5,664,216 | 9/1997 | Blumenau | 345/302 |
| 5,732,277 | 3/1998 | Kodosky et al. | 395/800 |

OTHER PUBLICATIONS

Coffe, P., et al, "Performs more functions fastor," PC Week, v.6, n. 42, p. 56(2), 1989.
Pain, S.W., "Synergy biulds procedures out of Windows apps," PC Magazine, v12, n 21, p. 40(1), 1993.

*Primary Examiner*—A. Katbab
*Attorney, Agent, or Firm*—Staas Halsey

[57] ABSTRACT

A method, apparatus and display for controlling defining and automatically executing a sequence of commands of a tool shelf. The user places (drags and drops) desktop icons from a tool box into a sequence tool shelf in an order in which the commands are to be executed. A directed list of the commands created during the placement of the icons in the sequence shelf, along with a current command pointer, is used to automatically control the execution of the commands in the order specified by the user. The execution can be performed without user input to indicate that the next command in the sequence should be executed or the user can control next command execution using a selection tool such as a marking menu. The icons of the commands are highlighted as the commands are executed to provide the user visual feed back concerning which command is currently being executed.

31 Claims, 16 Drawing Sheets

GRAPHICAL USER INTERFACE FOR DEFINING AND INVOKING USER-CUSTOMIZED TOOL SHELF EXECUTION SEQUENCE

This application is a continuation of application Ser. No. 08/566,078, filed Dec. 1, 1995, now abandoned.

BACKGROUND OF THE INVENTION

1. Field of the Invention

The present invention relates to the field of graphical user interface ("GUI") design for digital computers and, more particularly, involves a technique for defining and invoking user-customized sequences of commands based on the "tool shelf" GUI paradigm where the user places commands (icons) on a sequence tool shelf and designates an order of execution, and once entered and ordered the sequence automatically controls the execution order of the commands without requiring the user to select ("click-on") the commands.

2. Description of the Related Art

The "tool shelf" is a GUI technique known in the prior art that provides an on-screen pallet to which users may assign display icons corresponding to executable programs or commands. In creating the tool shelf the user "drags" desktop icons for the desired commands from one or more "tool boxes" to the tool shelf pallet and drops them on the pallet. As the user does this the conventional systems create a list of commands that are on the tool shelf. Once the user has dropped all the command icons on the tool shelf pallet that are desired the user can give the tool shelf a name. The typical systems allow the creation of multiple tool shelves that group commands according to a users desires and needs. These tool shelves can then be selected by "clicking-on" the "tab" (name) associated with the desired tool shelf. The selected tool shelf will be displayed in a visible tool shelf window and a user can then execute a command in the tool shelf simply by "clicking-on" the corresponding tool shelf icon (that is, by placing or positioning a pointer or cursor on the command icon and then depressing a selection button on a mouse or other pointing device). In this way, the user is given fast, convenient, one-button access to a custom set of particular programs, commands, or tools of interest to that user. For example, the typical GUI display 10, such as is provided with the STUDIO V7 software package available from Alias/Wavefront of Toronto, Ontario, Canada and shown schematically in FIG. 1, allows a user to "drag and drop" command desktop icons from a predefined "tool box" 12 onto a custom tool shelf 14. The commands can, of course, be removed from the shelf 14 by the same drag and drop operations. The tool box 12 is included in a tool pallet 16 of command icons, and is essentially a predefined library of tools, and is not interactively customizable by a user, whereas the tool shelf's contents are fully customizable by the user. The tool pallet 16 shown depicts five tool boxes each signified by a "tab", such as the tab 24 for the "objects" tool box.

Naturally, users generally populate the tool shelf with the most frequently used commands, or with a subset of commands generally used in a particular application of interest. These commands are then invoked by clicking on the desired command (icon). Some systems allow users to construct several different tool shelves, and to control which tool shelf is displayed at a particular moment by clicking on the "tab" or the like associated with each individual tool shelf. The tab generally displays a user specified name that is a description of the associated commands such as the tab 26 for an "Animation" tool shelf. The tool shelf pallet 18 shown in FIG. 1 is depicted with three tool shelves.

The prior art tool shelf interface approach is a reasonably effective GUI technique for some purposes, but remains limited. Current tool shelf designs do not permit users to define an ordering for the execution of a sequence of commands; indeed, they do not represent execution sequences at any meaningful level. This limitation may perhaps be acceptable in the context of a tool shelf containing icons representing disparate programs that are not primarily meant to be used together. However, a tool shelf may contain icons for a set of tools that are used together in an application, such as icons representing the various paintbrushes, colors, and geometric outlines available for use in a drawing or painting program. In this latter case, the ability to represent and define ordered sequences of execution can be very important. The problem of not being able to represent sequences of commands within the tool shelf paradigm is especially pronounced when certain sequences of commands are frequently repeated in a manner that is interleaved with interactive work by the user (e.g., "work flows"). For example, consider a work flow scenario in which the user of a geometric drawing program creates a sphere, moves the sphere, scales the sphere, rotates the view into a particular perspective view, returns the display to a normal work perspective, and then repeats the process. The icons for these operations are illustrated in different tool boxes in the tool pallet 16 of FIG. 1. Assuming that a user has created a customized tool shelf with all of these commands on it, the user must: (i) select (click-on) the "create sphere" tool icon on the tool shelf 14; (ii) move the screen cursor or pointer 20 to a location in the work area 22 of the screen 10 and click-on that location to specify initial placement of the new sphere; (iii) then go back to the tool shelf 14 and select the "move" tool icon; (iv) then once again "drag" or manipulate the cursor 20 within the work area 22 to move the sphere; (v) then once again return to the tool shelf 14 and select the "scale" tool; (vi) then once again drag the pointer 20 in the work area 22 to scale the sphere; (vii) then go back to the tool shelf 14 and select the "change to perspective view" command to evaluate the newly created sphere, and (viii) finally select "return to the normal view" command from the tool shelf 14 before repeating the entire process over again. Thus, even if an appropriate tool shelf is employed, in accordance with the prior art, the user must repeatedly move the cursor 20 (and more importantly, his or her attention) back and forth between the drawing area 22 and the tool shelf 14, and must mentally keep track of progress within the overall command sequence.

Moreover, because the tool shelf selections that make up the command sequence are, in the preceding example and in many real-life situations, necessarily interleaved with work area activity that varies each time the sequence is invoked (e.g., dragging or manipulating the cursor within the work area to select specific locations or scaling for the sphere), this problem is clearly not solved simply by combining prior art tool shelves with prior art macro recording tools.

What is needed is an improved GUI that preserves the intuitiveness and simplicity of the tool shelf paradigm, but that further allows users to define and automate common/custom execution sequences and that keeps the user apprised of the position of execution within the defined sequence.

SUMMARY OF THE INVENTION

It is an object of the present invention to allow a user to create a sequence tool shelf that automatically executes commands in a sequence defined in the tool shelf.

It is another object of the present invention to remove the need for the user to move back and forth between a tool shelf and a work area when performing repetitive tasks.

It is an additional object of the present invention to signal to the user the position in an execution sequence of a sequence of commands being executed.

It is also an object of the present invention to provide the user with the ability to control the execution sequence by moving backward in, forward in and terminating the sequence.

It is an additional object of the present invention to provide a display, an apparatus and a process for defining and controlling an execution sequence of commands that are easy to use.

The above objects can be attained by the present invention providing a graphical user interface ("GUI") display, apparatus and method that extends the "tool shelf" metaphor by adding the ability to represent a user-customizable execution sequence for the set of commands on a tool shelf, and by supplying a convenient mechanism for sequentially invoking the commands in that sequence. The invention also includes highlighting the desktop icons of the commands as the sequence is executed to indicate to the user the current position in the sequence. The user is also provided with a marking menu that allows control of the execution sequence without requiring that the pointer or cursor be removed from a work area.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
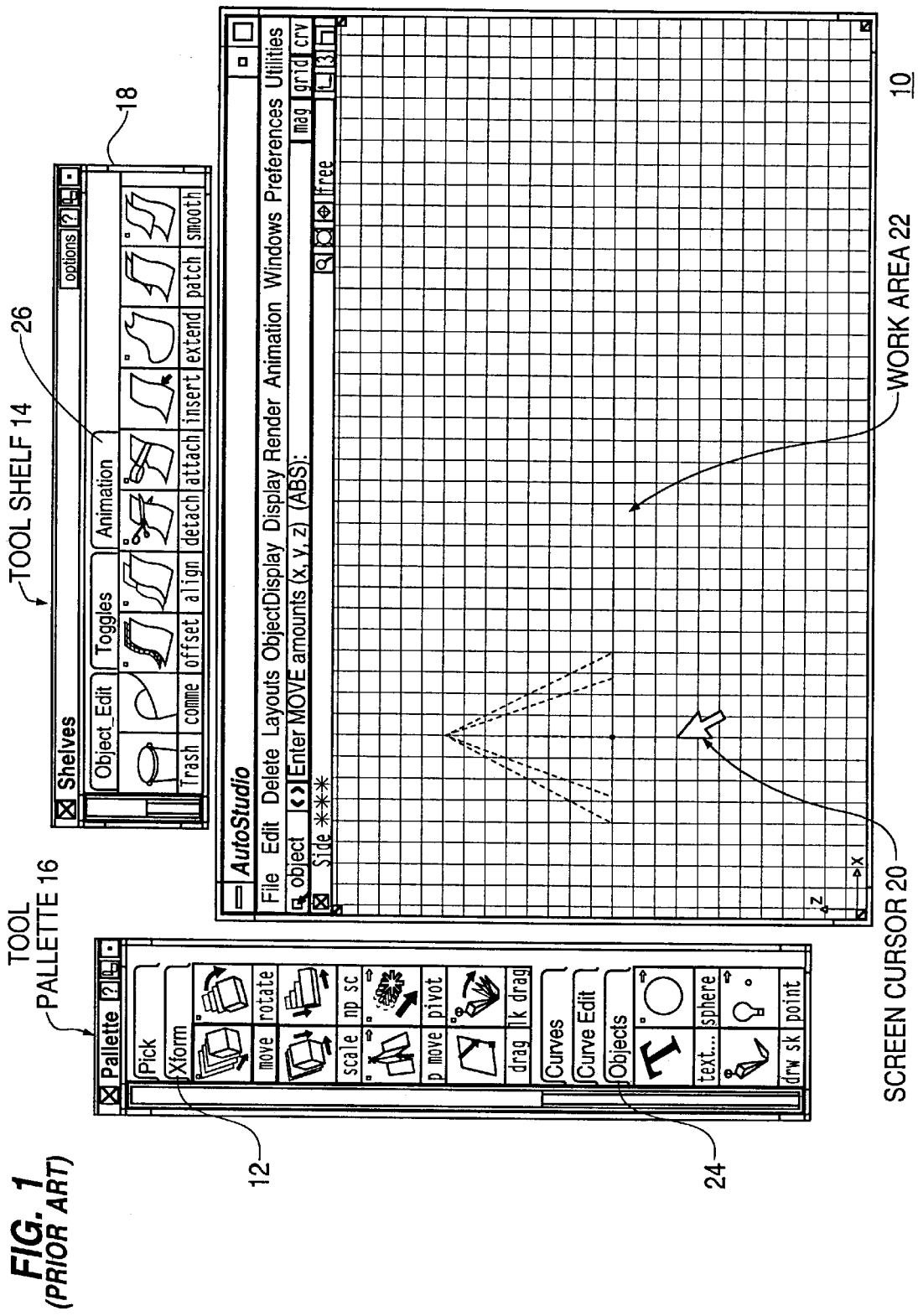
FIG. 1 schematically illustrates a graphical user interface of the prior art that includes tool boxes and tool shelves.
Figure 2:
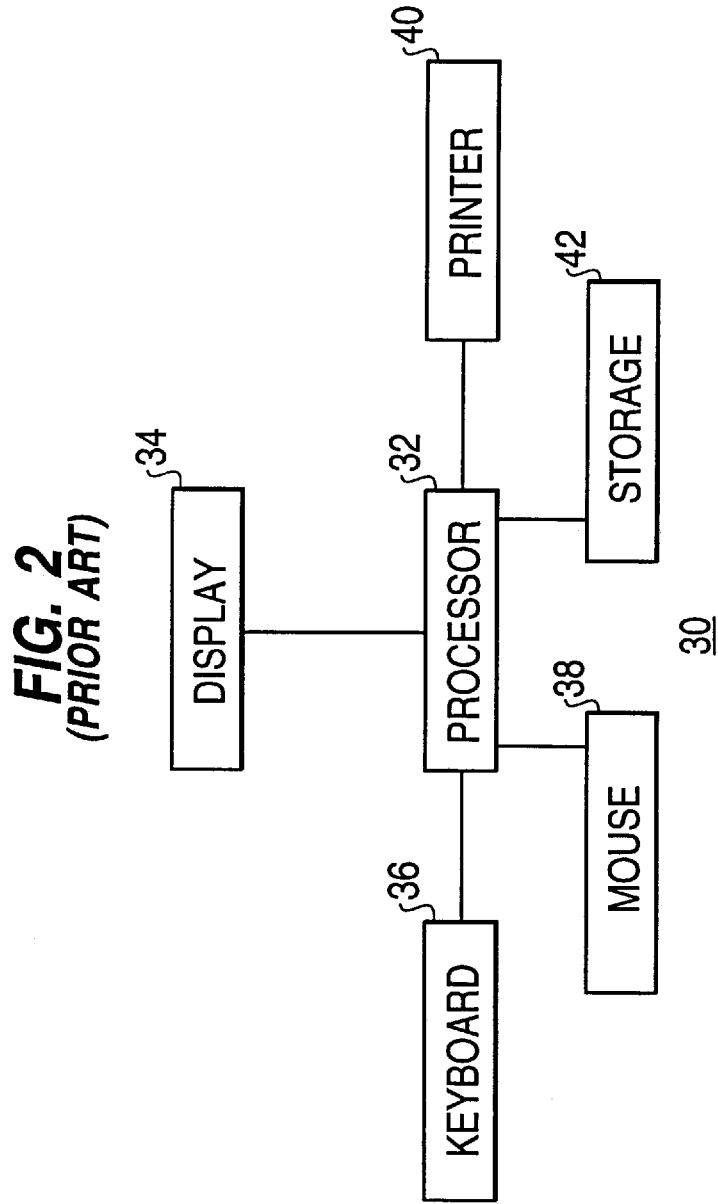
FIG. 2 depicts the typical hardware used in the present invention.

The present invention is typically implemented, as illustrated in FIG. 2, in a work station type computer system 30, such as a Silicon Graphics, Inc. work station, that includes a processor 32, a display 34 that displays a graphical user interface ("GUI"), and input devices, such as a keyboard 36 and a pointing device 38 such as a mouse, that allow a user to enter data if necessary, to move a cursor or pointer around in the GUI and to select items (desktop icons) within the GUI. The system 30 can also include a printer 40, or other output device, used to output the results of the users task execution and storage 42 in the form of RAM, hard magnetic disk, optical disk or floppy disk in which the process or software of the present invention is stored for or during execution. The computer 20 can, however, be any type of computer from a personal/portable computer to a main frame computer with the typical computer being the workstation type computer that is used for high volume production operations in which command selection is a significant portion of the operations performed by a user, such as in CAD/CAM and animation operations. The display 22 can also be any type of display that is capable of displaying a GUI, such as a CRT display or a liquid crystal display. The pointing device 26 can be any type of pointing device including a pen, a mouse, a track ball, a track point or a joy stick, either separate from or part of the keyboard 24. The display 22 and pointing device 26 can also be combined into a single device, such as touch sensitive screen.

One key aspect of the invention is how it relates to the common GUI "desktop metaphor".

For our purposes, a "desktop icon" refers to a screen icon displayed on the output monitor of a computer system that is associated with a computer file available to the computer's operating system, such that standard file operations can each be invoked with respect to the associated file by interactively performing a corresponding graphical gesture with the icon. For example, a request to execute the program contained in a file might be invoked by double-clicking on the associated desktop icon. Similarly, a request to delete a file might be invoked by graphically moving or "dragging" the associated desktop icon onto the displayed image of a trash can; or by cursor-clicking on the associated desktop icon and then cursor-clicking on a pull-down menu command labelled "delete." In response to such graphical actions, the operating system of the computer system will then perform the requested operation. A principle advantage of graphical, desktop-based interfaces of this nature is that the graphical gesture corresponding to each standard file operation is generic for all relevant desktop icons within a particular computer system—in other words, the graphical gestures that serve to request standard file operations are independent of the identity of the particular icon and file being operated upon. Consequently, a user need only learn one basic set of relatively intuitive gestures to perform standard file operations on all files within the user's computer system.

The desktop icon metaphor is also commonly applied to application program commands. A "desktop icon" also refers to a screen icon displayed on the output monitor of a computer system that is associated with a computer command available to an application program (or an operating system program), such that standard command operations can each be invoked with respect to the associated command by interactively performing a corresponding graphical gesture with the icon. For example, a request to execute a command might be invoked by clicking on the associated command icon. Similarly, a request to move a command (for example, moving a command from the tool pallet to a tool shelf) might be invoked by graphically moving or "dragging" the associated command icon to the new location; or by cursor-clicking on the associated desktop icon and then cursor-clicking on a pull-down menu command labelled "move," and finally pointing to a new location. In response to such graphical actions, the operating system of the computer system will then perform the requested operation. A principle advantage of graphical, desktop-based interfaces of this nature is that the graphical gesture corresponding to each standard command operation is generic for all relevant desktop icons and commands within a particular computer system—in other words, the graphical gestures that serve to request standard command operations are independent of the identity of the particular icon and command being operated upon. Consequently, a user need only learn one basic set of relatively intuitive gestures to perform standard operations and commands within the user's computer system.

Thus, a key advantage of the invention is that it allows command sequences to be constructed using common desktop operations and properties. For example, commands are gathered into a list by moving their command icons together and an ordering is specified by the natural ordering of appearance on the screen (i.e., left to right, top to bottom). The user only needs to learn how to indicate to the system that the group of commands is a sequence and how to automatically execute the sequence.

The present invention will be described for the purpose of understanding the invention with the use of flowcharts that typically show the operations in a somewhat serial or sequential fashion. However, because the invention is preferably implemented on a work station that is capable of performing many tasks in addition to those of the present invention, it likely that the invention will be implemented in an interrupt environment in which the operations are not linked in a serial or flowchart type fashion but rather execute based on the type of interrupt event that occurs.

Figure 3:
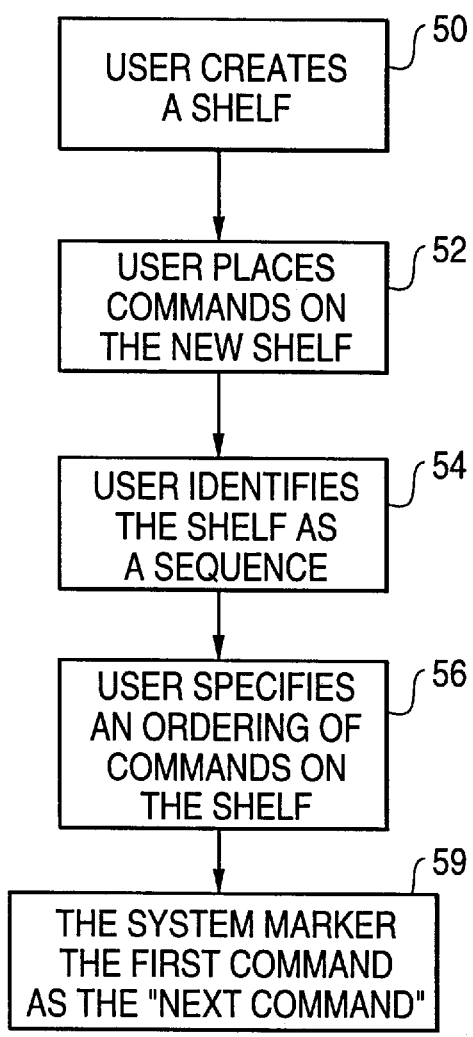
FIG. 3 illustrates the flow of the process for entering commands in a sequence shelf in accordance with the present invention.
Figure 4A:
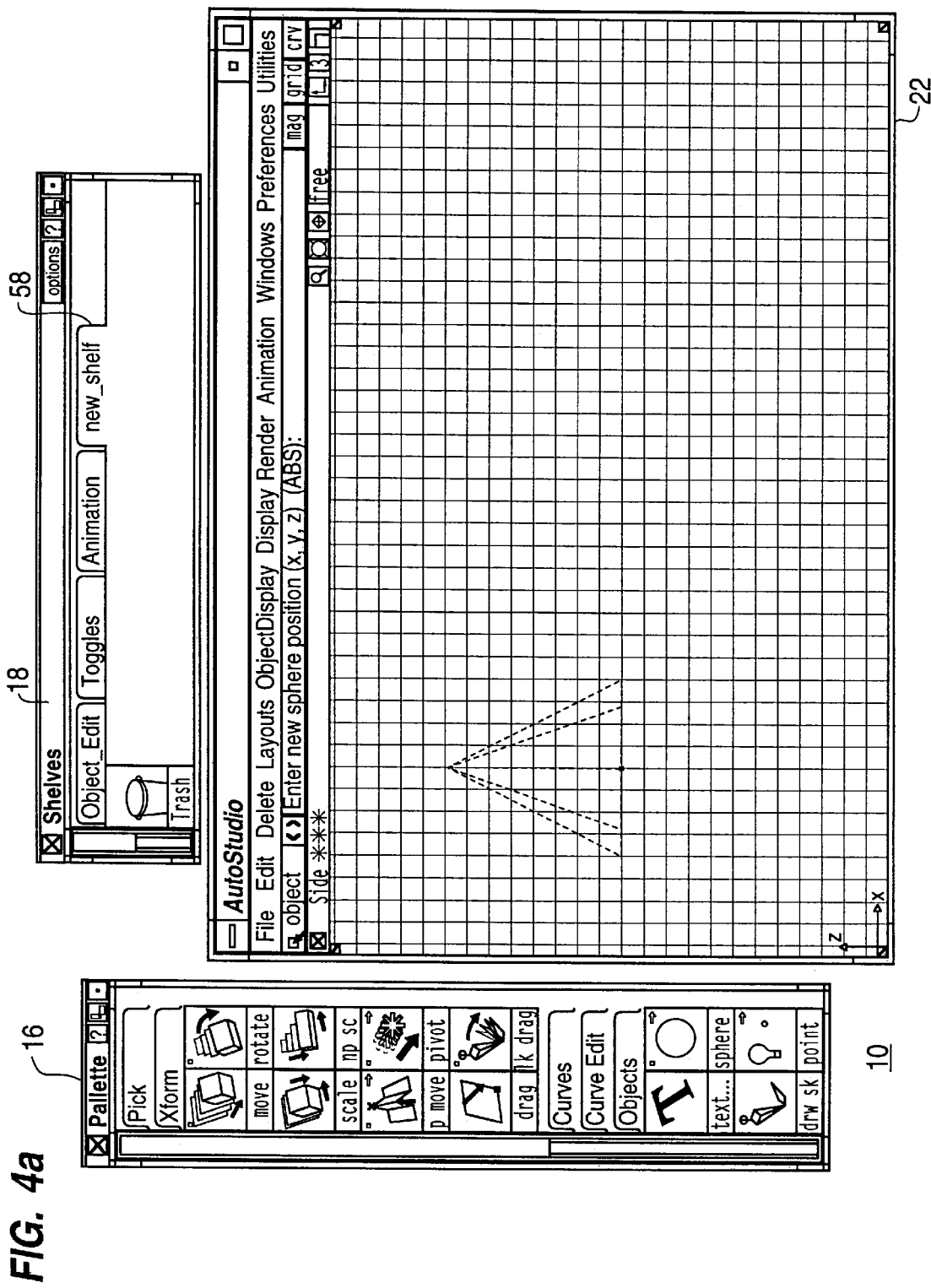
FIGS. 4a–4d illustrate the interactive construction of a sequential tool shelf by a user, in accordance with a preferred embodiment of the present invention.
Figure 4B:
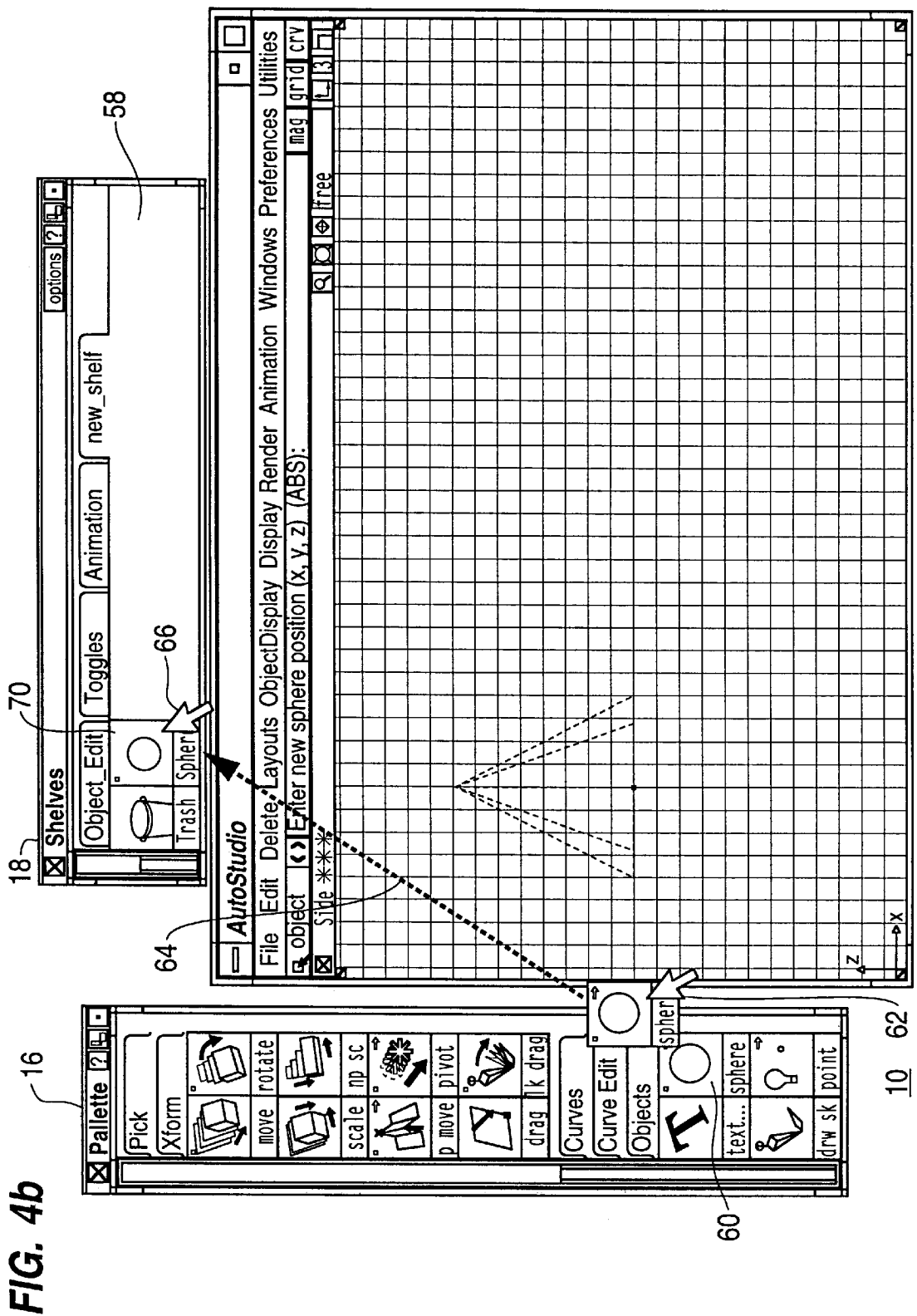
Figure 4C:
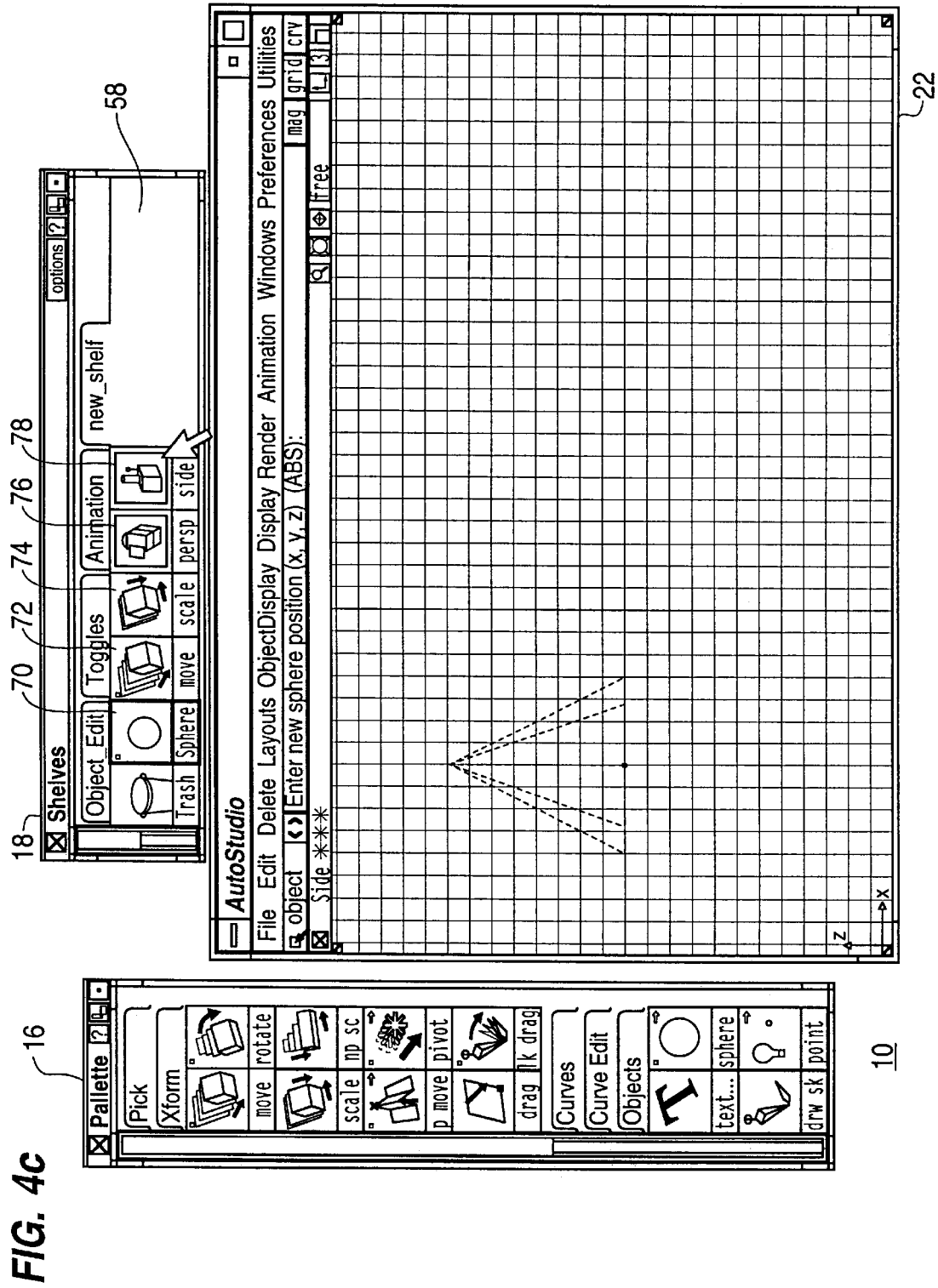

The creation of and use of a "sequence tool shelf" in accordance with the present invention will be described using the sphere to normal view command sequence example previously discussed. In a typical creation operation, as illustrated in the flow diagram of FIG. 3, the user would begin by initiating or creating 50 a new shelf 58, as illustrated in FIG. 4a, using conventional shelf initiation procedures, such as in the STUDIO V7 package previously mentioned. Once the new shelf 58 is initiated the user would begin placing 52 (see FIG. 3) commands in the new tool shelf 58 in a sequential left to right order by dragging the desktop icons for the commands from the tool boxes of the tool box pallet 16 to the new shelf 58 and dropping them on the new tool shelf 58 using conventional drag and drop procedures, the icons, of course, corresponding to the desired commands to be executed. For example, the sphere tool icon 60 would be selected 62 (see FIG. 4b) from the palette 16, dragged 64 to the new shelf 50 and would be dropped 66 on the shelf 58 reproducing the sphere icon 70 on the shelf 58. These operations would be repeated with the move icon 72 being placed to the right of the sphere icon 70, followed by the scale icon 74, followed by the perspective icon 76, followed by the normal view icon 78, as illustrated in FIG. 4c. It should be noted that any sort of sequence protocol could be used to specify the ordering of the execution of the commands. For example, icons could be ordered top to bottom, or the user could indicate the order by sequentially pointing to the icons after they are placed on the shelf 58. The underlying notion is that the user be allowed to specify interactively a execution order for the commands on the shelf 58, preferably in a visually intuitive manner.

Figure 4D:
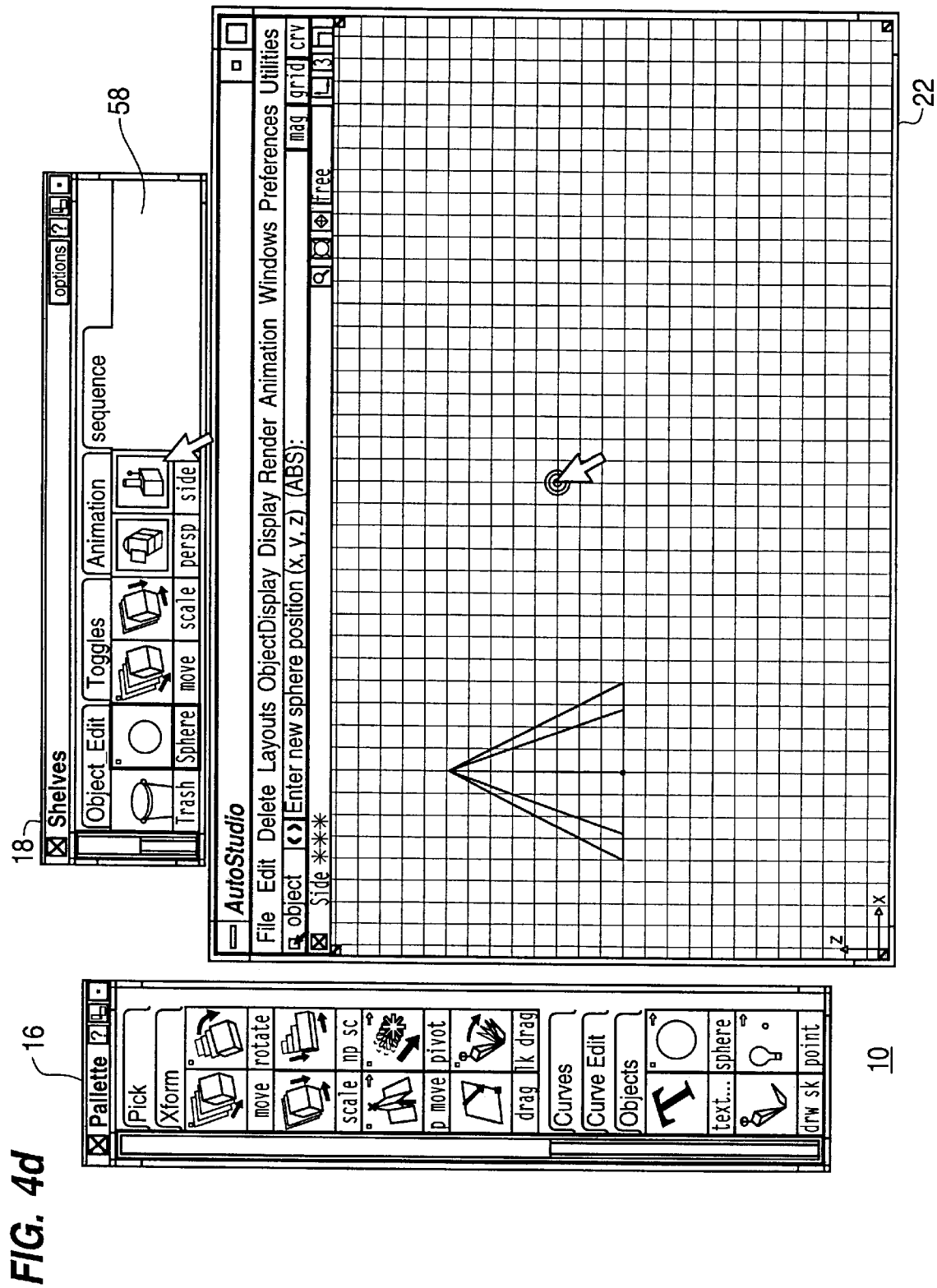

The user then preferably indicates 54 to the system (see FIG. 3) that this shelf 50 is a "sequence" shelf. Any means can be used to specify that a tool shelf 58 should be treated as a sequence of commands. For example, the user could include the string "sequence" in the name of the tool shelf (see for example FIG. 4d showing shelf 58 with the names "sequence"), or a special button or flag could appear on the tool shelf tab which when clicked-on controls whether or not the shelf is treated as a sequence. Those of skill in the art will readily recognize many other, equivalent mechanisms for interactively setting and adjusting the status of a tool shelf to indicate that it is a sequence tool shelf.

If the ordering of the sequence of commands is not specified by the positioning of the icons in the shelf 58 the system can allow the user to specify 56 (see FIG. 3) the ordering by pointing to the commands in the order of the desired execution as previously mentioned. This will allow the user to specify the repeat of a command without placing the icon on the shelf 58 more than once.

Once the user has completed adding icons to the shelf the system marks 59 the first command as the "next command" and begins executing the commands as will be discussed in more detail later. In the example discussed herein this would set a pointer to point to the sphere command.

Figure 5:
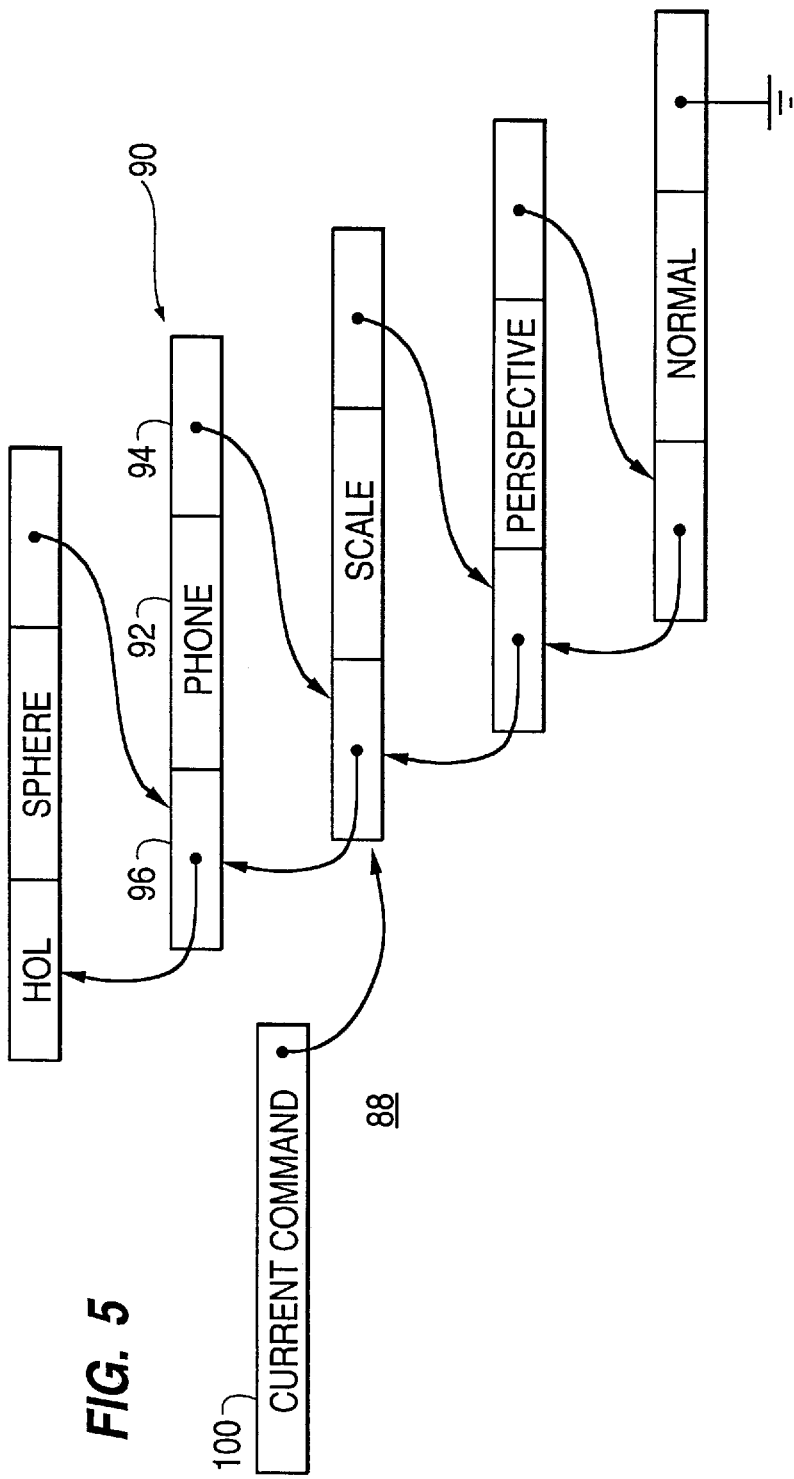
FIG. 5 depicts a data structure that can be used to control command execution sequence in accordance with the present invention.

As the user is adding the icons to the shelf 58 the system of the present invention creates an ordered list of the commands using a conventional list creation process. This list can be a sequential list stored in an array type data structure or more preferably in a pointer directed type data structure 88, such as illustrated in FIG. 5. In such a data structure 88 each item in the list, for example item 90, includes a command 92 (or possibly a pointer to a program or routine that performs the command), a pointer 94 to the next command in the sequence and a pointer 96 to the previous command in user specified the sequence. In this type of list the length of the list is not bounded, as would be the case of an array, and the next or previous command can be determined by conventionally following the pointers between items of the list. Other types of data structures could be used as long as they allow tracking of a position within the sequence of command execution. Of course the items of the list can include other types of information, such as a pointer to a command object (where a command object is a data structure which describes how a command can be executed and undone). To track the position within the list 88, or equivalently within the sequence of command execution, the present invention uses a current command pointer 100 that includes the address of the current command being executed or added to the list 88. In FIG. 5 this pointer 100 is pointing to the scale command. The content of this pointer 100 is updated as the current command changes.

The execution of the commands in the list in the desired sequence can be automatic with each command being executed as soon as all the information is available for execution or as soon as the prior command is completed, or the execution sequence can be controlled by the user. One way of allowing the user to control execution is to give the user the ability to initiate execution of the next command by depressing a button on the keyboard 36 or a certain one of the buttons on a pointing device, such as a mouse 38. For example, the next command request could be issued by pressing the → arrow key. In this way, the user can quickly work through the commands on the tool shelf 58 by pressing the → key, instead of having to select and click on the individual command icons on the tool shelf 58. In the example work flow previously discussed, this means that the user can essentially maintain focus squarely on the work area 22 in which the sphere is being manipulated. Each time an individual sub-task is completed, the user does not need to shift his or her attention away from the work area 22 and back to the tool shelf 58, but instead merely hits a convenient, generic button such as the → key without breaking stride. Nor does the user need to consciously keep track of what the next task in the sequence is, because the system automatically keeps track of what is the next program to invoke in the command sequence that is in progress.

Figure 6:
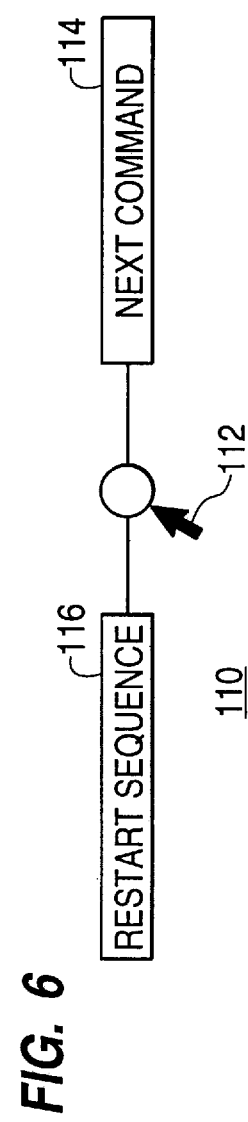
FIG. 6 depicts a marking menu that can be used to control stepping through a defined execution sequence according to the present invention.

It is also possible, and in many cases preferable, to allow the user to control the initialization of execution of each command using pop-up menus that pop onto the work area 22. The preferred type of pop-up menu control is a conventional pop-up "marking menu." A marking menu is a type of menu that pops up under or at the location of the pointer or cursor 20 when the user depresses a specified button(s) on the pointing device. The menu pops up under the pointer 20 and the user indicates a selection by moving the pointer 20 toward the menu item to be selected. Conventional processes are available for creating marking menus and processing marking menu selections. FIG. 6 illustrates a marking menu 110 that would be suitable for controlling execution of the sequence of commands placed in a sequence shelf 58. In this menu 110 when the pointer 112 is moved toward menu item 114 which is the "Next Command" item, the system moves to and executes the current command in the list 88 and moves the current command to the next command in the list. When the pointer 112 is moved toward item 116 which is the "Restart Sequence" menu selection the system returns to the front of the list 88.

Figure 7A:
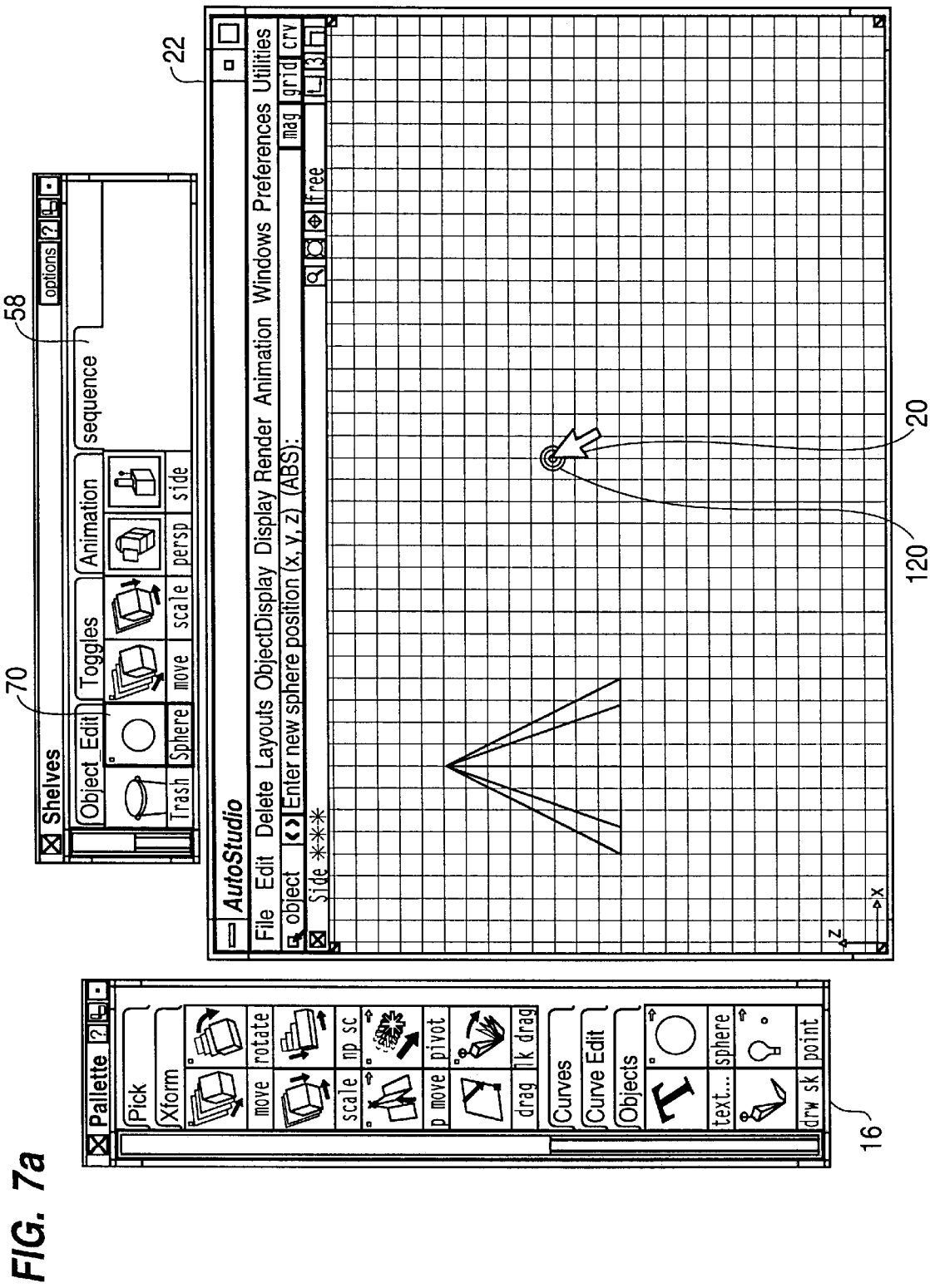
FIGS. 7a–7e depicts display changes performed when an example command sequence is executed.
Figure 7B:
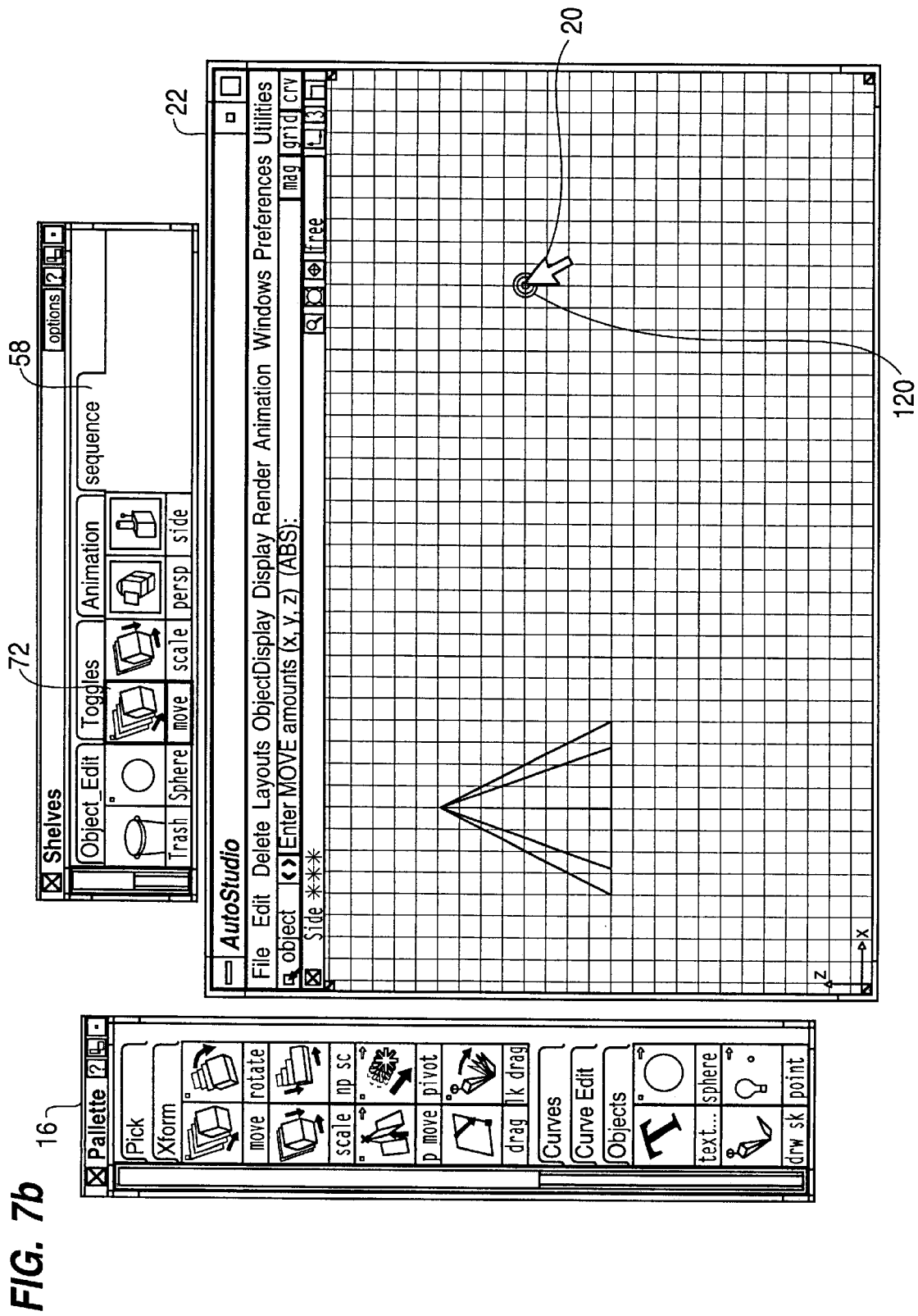
Figure 7C:
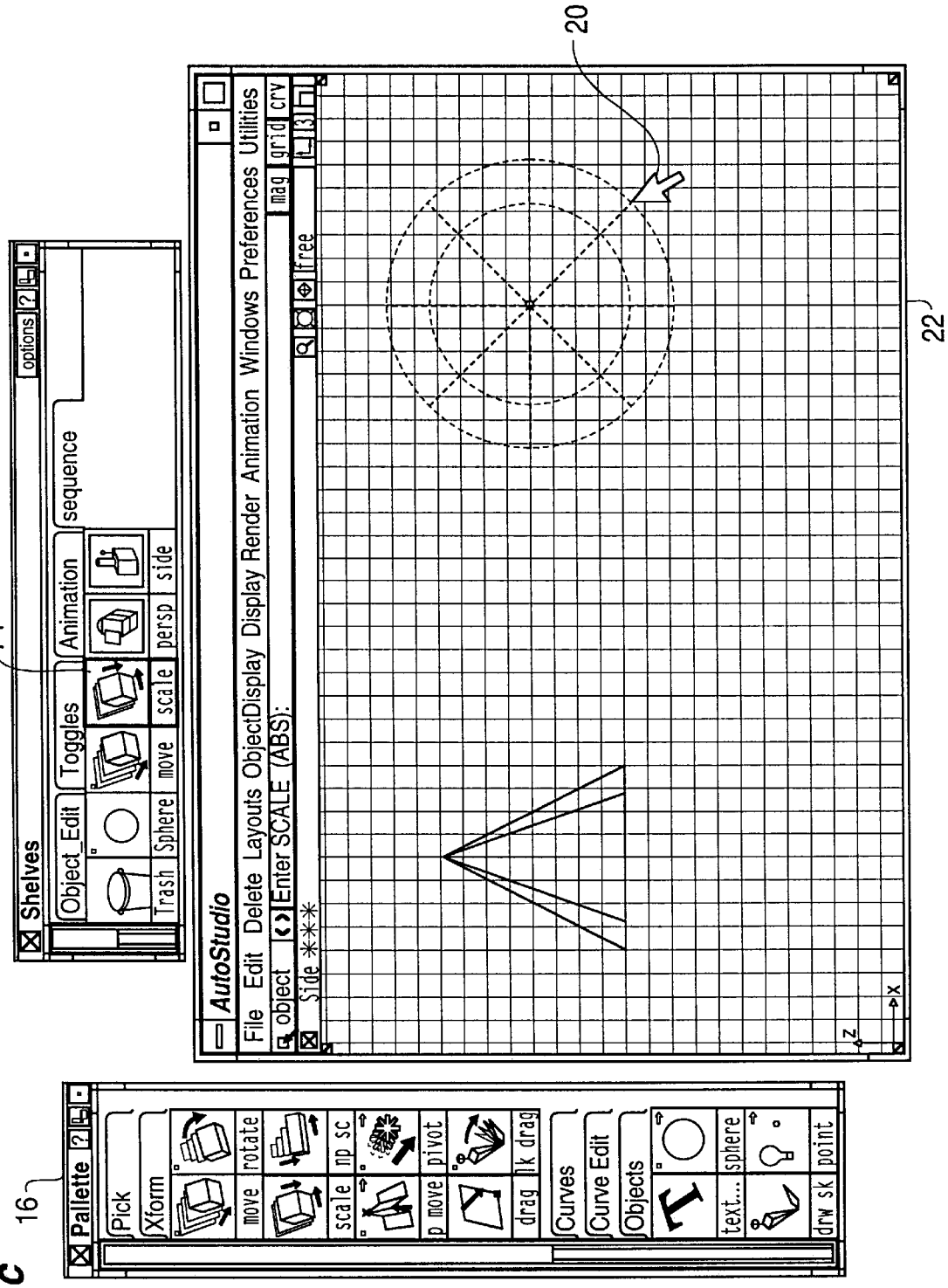
Figure 7D:
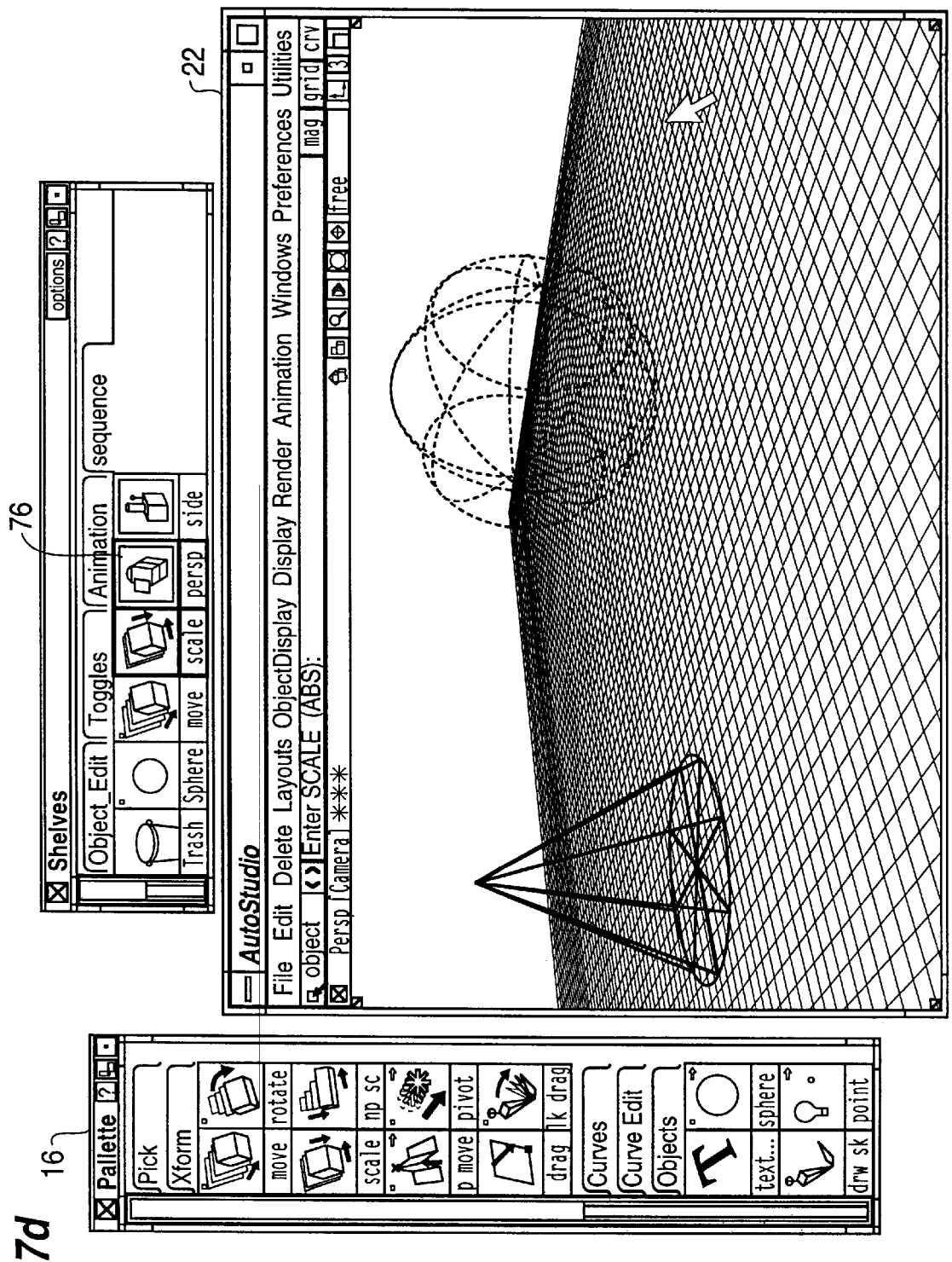
Figure 7E:
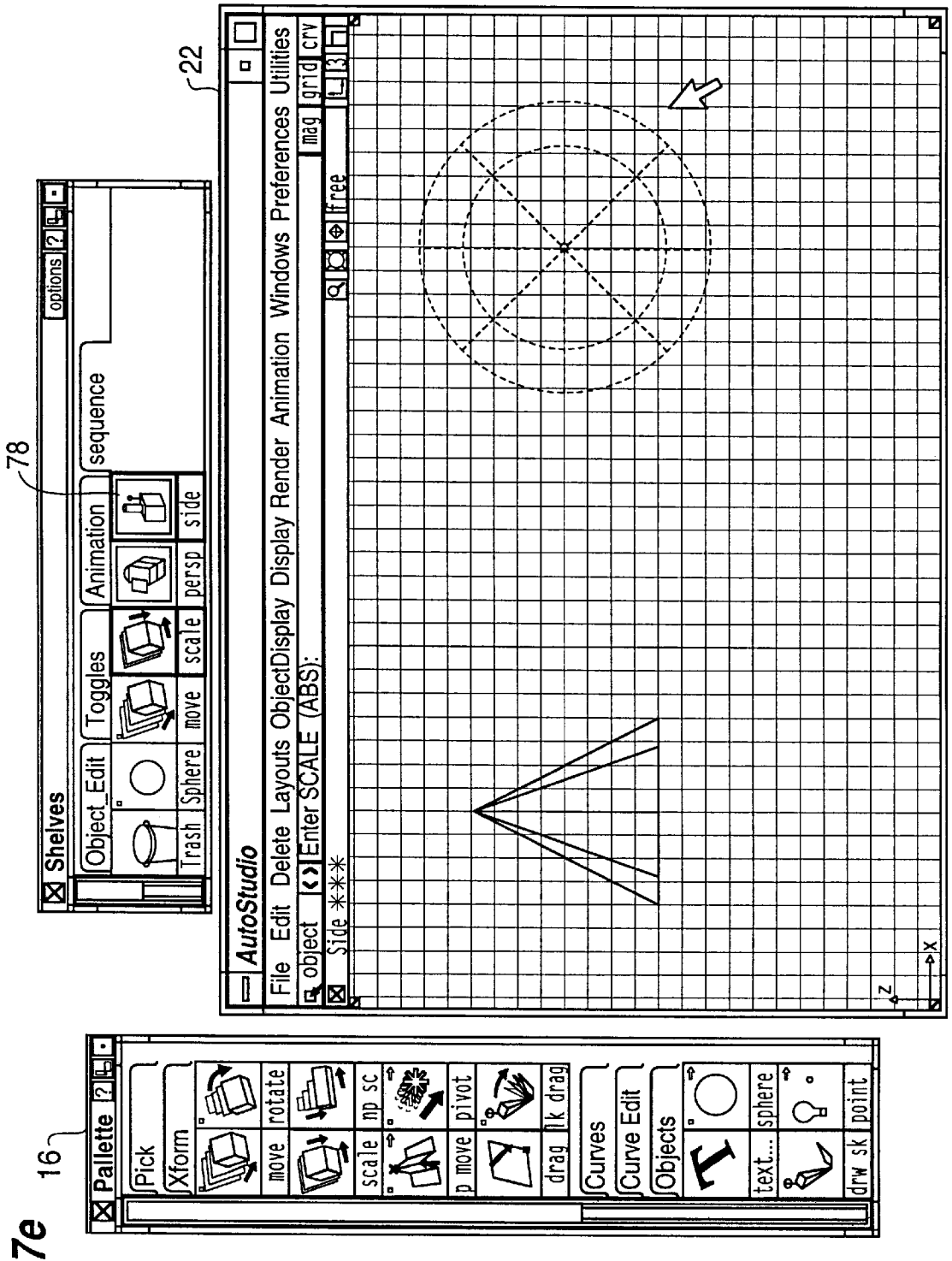

FIGS. 7a–7e illustrate the changes in the GUI during the execution of the commands 70–78 of the shelf 58 depicted in FIG. 4c using an execution control tool, such as the marking menu 110 of FIG. 6. FIG. 7a depicts that the tool shelf has been named "sequence" and that the next command function has been activated with the pointer 100 pointing at the first command 70 ("sphere"). This has placed a sphere 120 at the location of the pointer 20. This figure also shows a dark band (indicating "highlighting") around the icon 70 indicating to the user that this is the command being executed. FIG. 7b depicts the GUI after the "move" command 72 has been executed by selecting item 114 of the menu 110. Once again the command icon (72) of the command being executed is highlighted. In FIG. 7c the "scale" command 74 is shown being executed with the sphere being sized by the movement of the pointer 22 away from the center of the sphere. FIG. 7d illustrates the "perspective" command 76 being executed while FIG. 7e illustrates execution of the "normal" view command 78 after item 114 of the menu is selected. Note that as the execution sequences a different icon is highlighted. It is also important to note that the execution of each command illustrated in FIGS. 7a–7e in accordance with the present invention takes place automatically where the system does not require the user to provide any further information for the selection or specification of what command to execute next.

Figure 8:
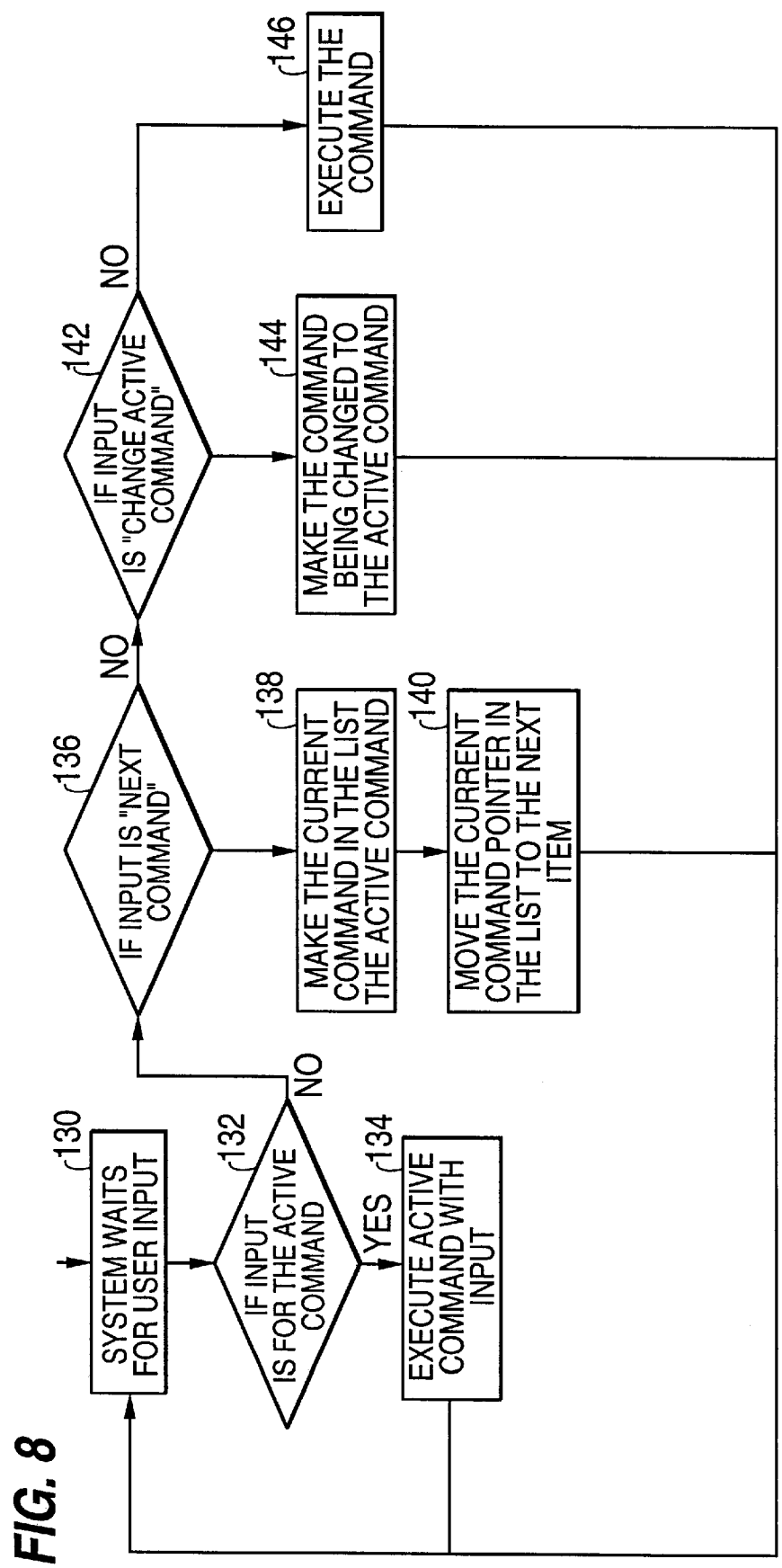
FIG. 8 illustrates the process of executing a command sequence defined by a sequence shelf according to the present invention.

The process performed by the present invention during the GUI changes depicted in FIGS. 7a–7e is depicted in the flowchart of FIG. 8. Most commands of systems, such as the STUDIO V7 system previously mentioned, are modes, that is, once a mode command is selected, the same command is repeated until the user specifies a different command mode. For example, the sphere commands is really "create sphere mode" and "create sphere mode" consists of series of "create sphere" commands. The algorithm for this type of mode is:

repeat until user selects another command
        wait for user to enter location for sphere
        create a sphere at the location Some commands are modeless. When these commands are selected and executed the mode of the system remains the same. For example, the system may be in "create sphere mode" and selecting the "change view to perspective" command changes the view on the data but once the system is done changing to the perspective view the "create sphere mode" is resumed. The command execution described below is a mixture of these two types as will be understood from the discussion below.

In the first step pointer 100 is set to point at the first command on the list 88 which in this case is the sphere command and the system waits 130 for a user command input. The user can input many other commands or operation requests other than the pop-up menu selection operation for controlling the execution of the sequence shelf 50 of the present invention. When an input is provided the system determines 132 whether the input is for the current command. If so, the system executes 134 the command current (active) using the input data. If the input is not for the current command the system determines 136 whether the command is the next command 114 of the pop-up marking menu 110 or some other type of command. If the command is the "next command" 114 of the menu 110, the command of the list 88 pointed at by the pointer 100 is highlighted and made 138 the active command, followed by moving 140 the pointer to the next item. If the command is not the "next command" the system determines 142 whether the input indicates that the active command should be changed. If so, the active command is changed 144. If the input was not a change active command input the system executes 146 a modeless command. When a command from a sequence is finally executed (at 134) this execution process is performed by conventionally excuting the conventional process or routine of the command in the same manner as the command would be executed if the user were selecting the command for execution from a tool shelf that was not a sequence tool shelf. The process then returns to wait 130 for another command or request by the user.

Figure 9:
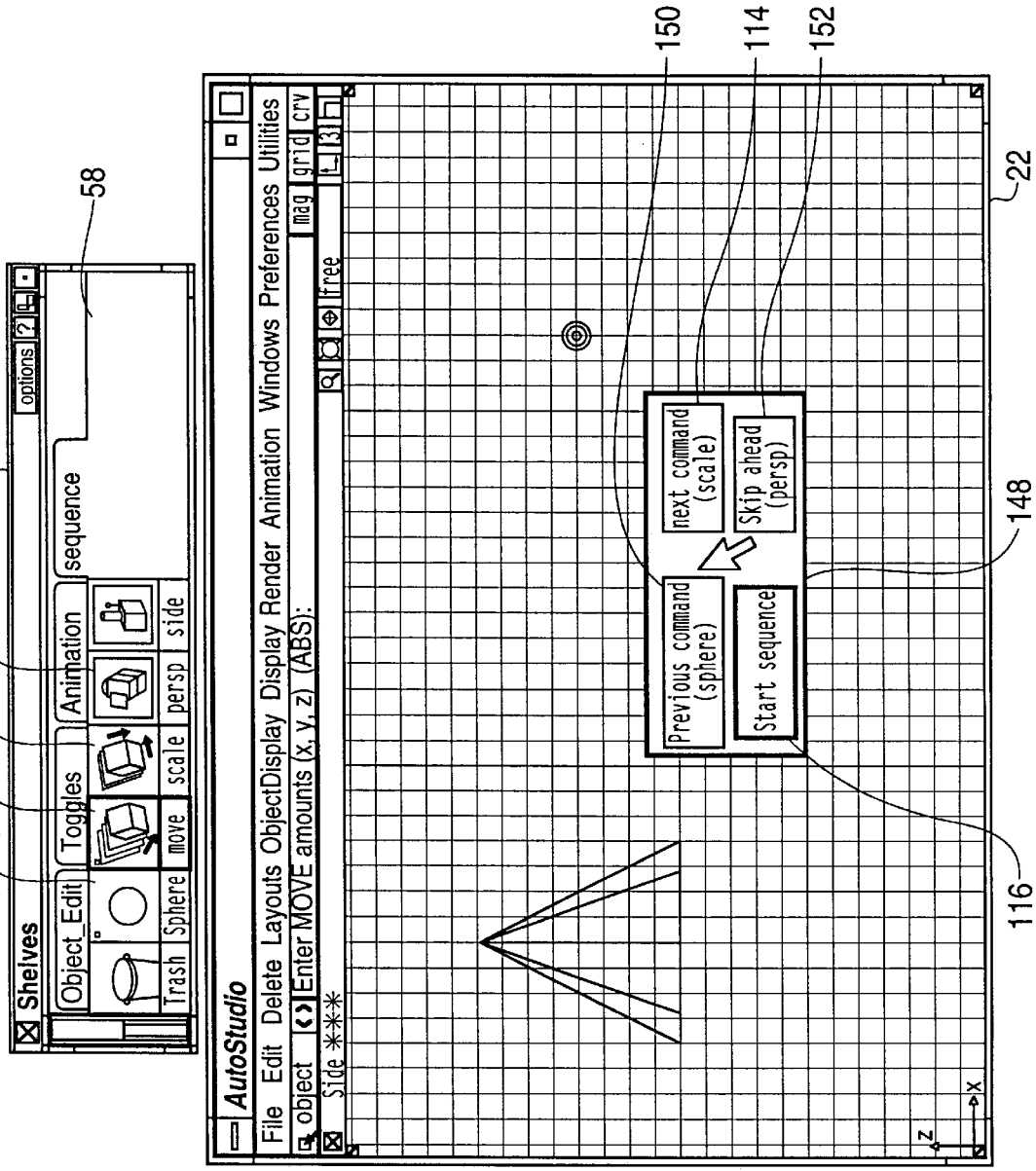
FIG. 9 schematically illustrates a preferred GUI in accordance with a preferred embodiment of the present invention.

In the preferred embodiment of the present invention, the "next command" request is issued by triggering the special "pop-up" marking menu 110, such as by striking a predefined combination of keys and/or mouse strokes, and then selecting "Next Command" 114 from the pop-up menu 110. The pop-up menu preferably also permits additional controls for executing command sequences which are illustrated in FIG. 9. The pop-up menu 110 of FIG. 6 includes the option (116) to revert the system to the start of a sequence as well at the next command option 114. These options 114 and 116 are also provided in the pop-up menu 148 of FIG. 9. The menu 148 of FIG. 9 also includes the option 150 to move one command back in the sequence, or to skip ahead 152 one command in the sequence. As can be seen the menu 148 also textually indicates which command is the previous command, the next command and the skip ahead command. The particular sequence position illustrated in FIG. 9 depicts the move command 72 (see highlighted icon in the shelf 58) being executed with the previous command being command 70 ("sphere"), the next command being "scale" 74 and the skip ahead command as being the "perspective" command 76. As those skilled in the art will appreciate, other mechanisms for navigating through a sequence of commands could additionally or alternatively be used. An advantage of this pop-up menu 148 embodiment is that the user is given further control over the execution of commands. At the same time, to let the user maintain focus on the primary work area 22, the pop-up menu 148 is preferably invoked and then interacted with, using the cursor control device, all within the screen location of the primary work area 22 as illustrated in FIG. 9.

Whether a keystroke combination, a menu selection, or some other input mechanism is employed as the protocol to request execution of the next command in the sequence, the bottom line is that a generic request protocol is used, in accordance with the present invention. By "generic" herein it is meant that the request is performed in the same fashion regardless of which particular command is being executed. This approach distinguishes, for example, the use of a prior art tool shelf in which a user would need to click on a specific, individual icon to invoke execution of the corresponding program. In accordance with the present invention, the user instead issues a generic interactive request that is invariant from one command to the next, including but not limited to techniques such as striking a fixed combination of keys or choosing from a pop-up menu.

Figure 10:
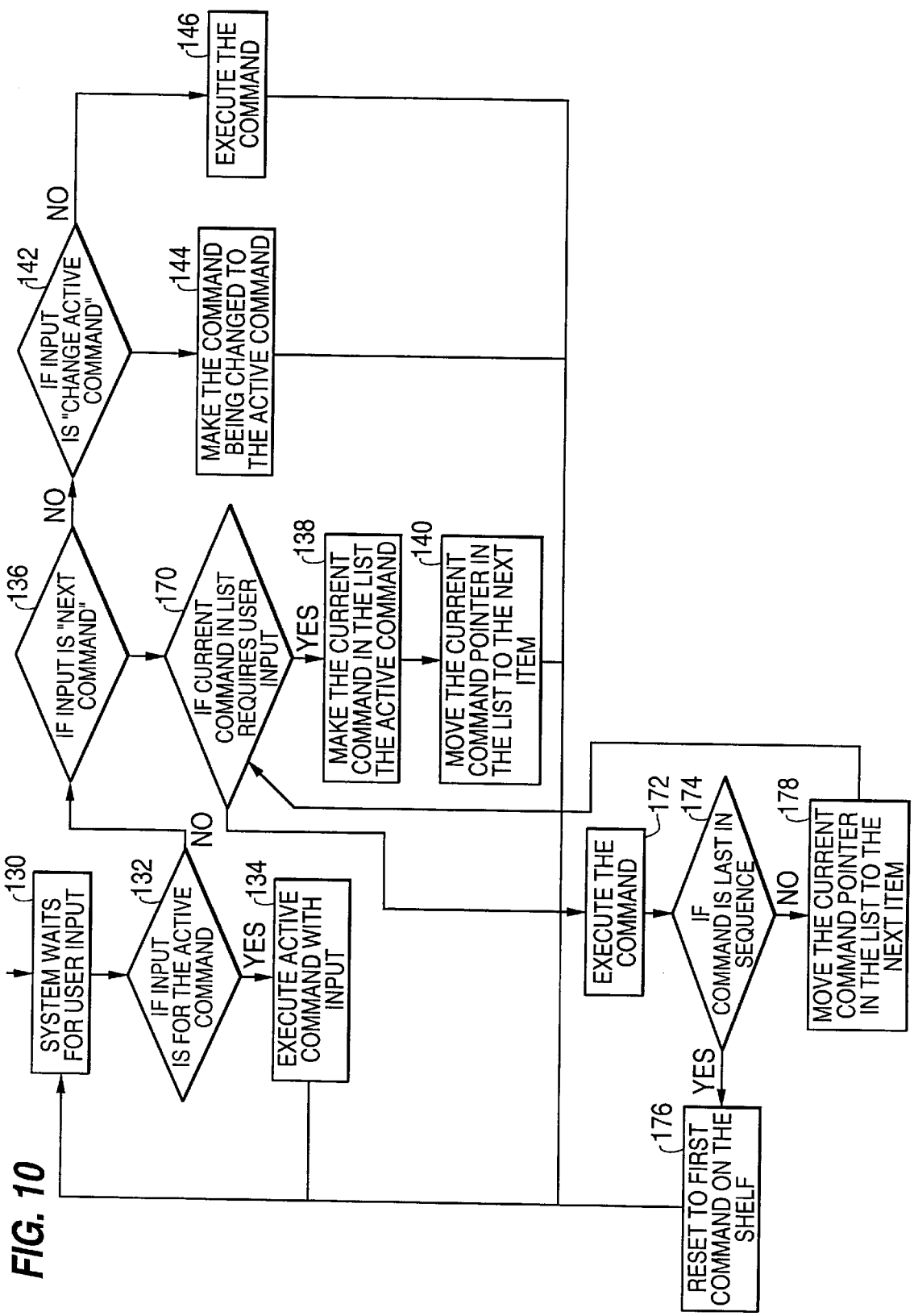
FIG. 10 is a flow diagram of the execution process when some commands can be automatically executed without user input according to an embodiment of the present invention.

Note that some commands in certain sequences may not necessarily have to be executed one at a time. For example, it might be useful for a sequence shelf to execute commands in sequence without stopping until it gets to a command that might trigger responsive user input. This modification to the process of the present invention is illustrated in FIG. 10. Thus, preferably, each time a "Next Command" request is processed, the system not only executes the next command in the sequence, but also determines 170 whether the current command in the sequence is one that permits responsive user input. If the command does not permit responsive user input, then the command is automatically executed 172. In this modified operation the system must also check 174 to determine whether the end of the sequence has been reached, reset 176 the pointer 100 to the start of the sequence if so and if not, the pointer is moved 178.

Preferably, there is in principle no limit to the number of sequence tool shelves that can be defined by a user in accordance with the present invention, as long as only one sequence tool shelf mechanism is permitted to be active at any one time. Those of ordinary skill in the art will be readily familiar with many straight forward interactive mechanisms for specifying which tool shelf is currently active at a given moment.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An interactive method for defining and invoking a user-customized sequence of commands, each of said commands being graphically represented by an associated display icon, said method for use with a digital computer system including a display screen and a cursor control device, and said method comprising:

creating interactively a graphical tool shelf using the cursor control device, the tool shelf comprising display icons positioned in a first region of the display screen;

specifying interactively an execution order for the commands corresponding to the display icons in the tool shelf by the user placing the icons in the execution order on the tool shelf, using the cursor control device;

invoking execution of the corresponding commands according to the specified execution order, by interactively responding to a generic execution request;

permitting, in response to at least one of the executed commands, a user to perform interactive work in a second region of the display screen using the cursor control device, before a next command in the execution order is invoked; and permitting the user to selectively execute the commands corresponding to the icons by selecting the icons individually while in the first region and the icons having a same function as when executed according to the specified execution order.

2. A method as recited in claim 1, wherein the creating is performed multiple times creating a plurality of tool shelves, and wherein the remaining steps of the method are each performed separately with respect to each of the tool shelves.

3. A method as recited in claim 1, wherein the creating includes interactively specifying whether the tool shelf command execution order is sequential or not, and wherein the remaining steps of the method are only performed in the event that the tool shelf is specified to be sequential.

4. A method as recited in claim 1, wherein the specifying includes interactively arranging the display icons in an horizontal order corresponding to the execution order.

5. A method as recited in claim 1, wherein the specifying includes interactively arranging the display icons in a vertical order corresponding to the execution order.

6. A method as recited in claim 1, wherein the computer system further includes a keyboard, and wherein the generic execution request comprises striking a predetermined combination of keys on the keyboard.

7. A method as recited in claim 1, wherein the generic execution request comprises selecting a "next command" item from a pop-up menu on the display screen.

8. A method as recited in claim 1, further including skipping over one or more positions in the stored execution order, by interactively responding to a generic skip request.

9. A method as recited in claim 1, further including backing up one or more positions in the stored execution order, by interactively responding to a generic backup request.

10. A method as recited in claim 1, further including reverting execution to the beginning of the stored execution order, by interactively responding to a generic revert request.

11. A method, comprising:

placing icons in a graphical sequence order to be executed;

automatically executing the commands in the sequence order; and allowing the icons to be selected individually for execution while in the order and perform a same function as when automatically executed.

12. A method for specifying a desired execution order for a plurality of commands, each one of the commands being associated with a corresponding desktop icon, the method comprising:

placing the desktop icons in a graphical order corresponding to the desired execution order;

automatically executing the desktop icons in the desired execution order, without requiring a user to specify further the desired execution order; and allowing the icons to be selected individually for execution while in the order and perform a same function as when automatically executed.

13. A method as recited in claim 12, wherein the placing step places the commands on a sequence tool shelf.

14. A method as recited in claim 13, wherein the placing step places icons representing the commands on the sequence tool shelf and the executing step includes highlighting the icons of the commands as the commands are being executed.

15. A method as recited in claim 12, wherein the list is a pointer directed list and further comprising a current command pointer indicating which command is a next command.

16. A method as recited in claim 12, wherein the executing step comprises allowing a user to initiate execution of each command.

17. A method as recited in claim 16, wherein the user initiates execution of each command using a menu selection.

18. A method as recited in claim 17, wherein the menu includes selections for next command, previous command, skip to a command ahead and start command sequence.

19. A method as recited in claim 12, wherein the executing step allows a user to initiate operations other than the commands of the sequence.

20. A method comprising controlling a computer to create a sequence of desktop icons in a graphical order specified by a user by placing the icons in a sequence order, automatically executing the commands in the order and allowing the icons to be selected individually for execution while in the order and perform a same function as when automatically executed.

21. An apparatus, comprising:
 a display for displaying a graphical user interface including a tool box of commands represented by desktop icons, a work area and a sequence tool shelf;
 an indication device indicating icon selections and positions as controlled by a user and allowing the user to individually select the icons; and
 a computer coupled to the display and the indication device and creating the graphical user interface, moving the icons from the tool box and placing the icons on the sequence tool shelf responsive to selection of the icons and position indications for the icons on the sequence tool shelf as indicated by the user, defining a command order from the position indications and controlling execution of the commands in the order and allowing the icons to be selected individually for execution by the user while in the positions on the sequence tool shelf and perform a same function as when executed in the order.

22. An apparatus as recited in claim 21, wherein said computer highlights the icons of the commands on the display as the commands are executed.

23. An apparatus as recited in claim 21, wherein said computer produces a menu in the work area of the display from which the indication device can control initiation of the commands.

24. A display, comprising:
 a work area where the results of command executions are displayed; and
 a sequence tool shelf located adjacent to the work area and including commands to be executed in an order defined by their placement by the user within the tool shelf where the commands can be executed in the order and individually selected for execution while in the order and perform a same function.

25. A display as recited in claim 24, further comprising a tool box located adjacent to the work area from which commands are moved to and placed on the sequence tool shelf in the order of execution.

26. A display as recited in claim 24, wherein the commands are represented by icons on the sequence tool shelf and the icons are highlighted as the commands are executed.

27. A display as recited in claim 24, further comprising a marking menu providing text indicating next and previous commands.

28. A display as recited in claim 24, wherein the commands can be selected from the sequence tool shelf for execution.

29. A display as recited in claim 24, wherein commands can be removed from the sequence tool shelf.

30. A computer readable storage medium including a process used to direct a computer to create a sequence of desktop icons in a graphical order of execution responsive to user command selection, to execute the commands automatically in the order and to allow the user to individually select the icons while in the order and perform a same function as when automatically executed.

31. An interactive method for defining and invoking a user-customized sequence of commands, each of said commands being graphically represented by an associated desktop display icon, said method for use with a digital computer system including a display screen and a cursor control device, and said method comprising:
 creating interactively a graphical tool shelf using the cursor control device, the tool shelf comprising display icons positioned in a first region of the display screen by interactively specifying whether the tool shelf command execution order is sequential or not, and where the remaining steps of the method are only performed in the event that the tool shelf is specified to be sequential;
 specifying interactively an execution order for the commands corresponding to the display icons in the tool shelf, using the cursor control device by the user interactively placing the display icons in an horizontal order corresponding to the execution order;
 invoking execution of each of the corresponding commands according to the specified execution order, by interactively responding to a generic execution request by selecting from among a "next command" item, a "skip ahead" item, a "previous command" item and a "start sequence" item from a pop-up menu on the display screen;
 permitting, in response to at least one of the executed commands, a user to perform interactive work in a second region of the display screen using the cursor control device, before the successive command in the execution order is invoked; and
 permitting the user to selectively execute the commands corresponding to the icons by selecting the icons individually while in the first region and the icons having a same function as when executed according to the specified execution order.

* * * * *